(No Model.)
G. W. HARRINGTON.
MOLD FOR LINING UNIONS OR COUPLINGS.
No. 536,343.                        Patented Mar. 26, 1895.
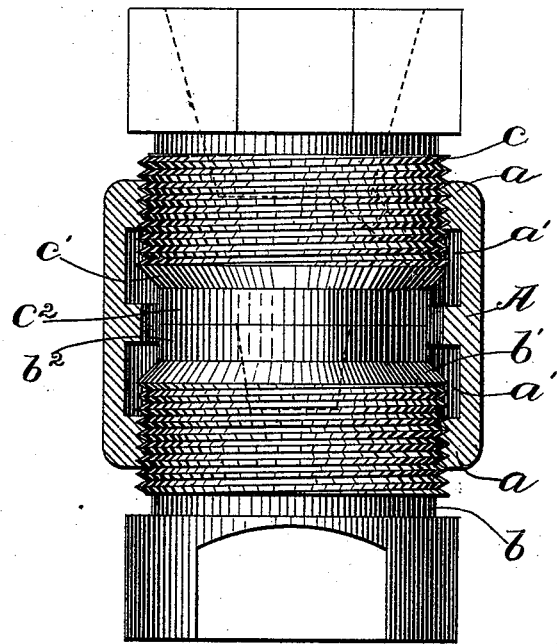
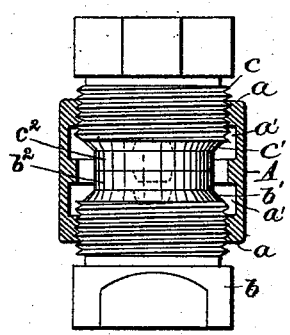
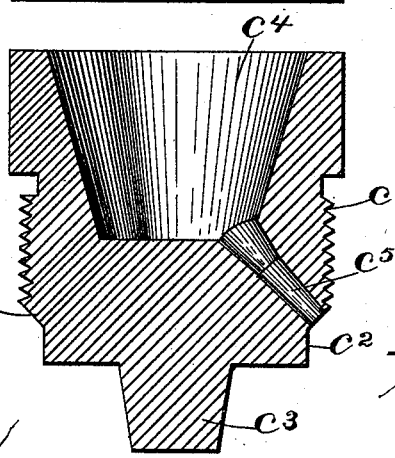
WITNESSES
Charles B. Crocker
John N. Morrison
INVENTOR
George W. Harrington
by B. J. Hayes,
atty.

UNITED STATES PATENT OFFICE.

GEORGE W. HARRINGTON, OF WAKEFIELD, MASSACHUSETTS, ASSIGNOR TO THE NEW ENGLAND WATER PIPE COMPANY, OF SAME PLACE.

MOLD FOR LINING UNIONS OR COUPLINGS.

SPECIFICATION forming part of Letters Patent No. 536,343, dated March 26, 1895.

Application filed August 24, 1894. Serial No. 521,199. (No model.)

*To all whom it may concern:*

Be it known that I, GEORGE W. HARRINGTON, of Wakefield, in the county of Middlesex and State of Massachusetts, have invented an Improvement in Molds for Lining Unions or Couplings, of which the following description, in connection with the accompanying drawings, is a specification, like letters on the drawings representing like parts.

This invention has for its object to construct an apparatus or mold for casting or forming a lining, as for instance of lead, or composition containing lead, upon the interior of a pipe fitting, such as a union, or coupling.

The fitting, when lined, is composed of a shell usually of cast iron, with an internally screw threaded portion at one or both ends thereof, the outer ends of said threaded portions being formed of the material of which the shell is composed, and the inner ends being formed of lead or the material of which the lining is composed, that is to say, there are threads formed in the lining that are continuations of the threads formed in the shell. Between the threaded portions at the ends of the union or coupling the interior of the fitting is continuously lined.

In accordance with this invention the fitting has an inwardly screw threaded flange or rib at each end, and next to each flange an annular recess is formed in the bore of the fitting. Externally screw threaded plugs are screwed into the fitting, the threaded portions of which project inwardly beyond the flanges, and one of said plugs has a passage through it for the molten metal of which the lining is composed. The plugs may be made long enough to abut endwise against each other, their inner ends being smaller in diameter than the internal diameter of the fitting. The molten metal is poured through the pouring plug, entering said annular space and forming the lining, and as the inner ends of the plugs project beyond the flange said molten metal forms itself around said plugs, so that when they are removed, threaded portions are formed adjacent to and in continuation of the screw threads on the flanges. The plugs are or may be formed with tapering portions, enabling the formation of seats in the lining.

Figure 1, shows in vertical section an apparatus or mold for forming the lining upon the interior of a union or coupling, or similar pipe fitting; Fig. 2, a vertical section of the pouring plug, and Fig. 3, a vertical section of a modification to be referred to.

The pipe fitting A, represented as a union or coupling, consists of a shell, usually of iron, having at each end an inwardly projecting flange or rib $a$, internally screw threaded, and adjacent to each flange an annular recess $a'$ is formed. An externally screw threaded plug $b$ is screwed into the lower end of the union, its screw threaded portion projecting inwardly beyond the flange $a$, and having a tapering portion $b'$, and also a short projecting end $b^2$, provided with a central recess. See dotted line Fig. 1. This plug is herein designated as the base plug. A similar externally screw threaded plug $c$ is screwed into the upper end of the fitting, its screw threaded portion projecting inwardly beyond the flange $a$, and having a tapering end portion $c'$, and also a short end portion $c^2$, which abuts against the end portion $b^2$, of the screw threaded plug $b$, a projection $c^3$, being formed upon the inner end of the plug $c$, which enters the recess formed in the inner end of the plug $b$. A passage is formed through the plug $c$, which, as shown in Fig. 2, is formed as an enlarged recess $c^4$, from the lower end of which leads diagonally a passage $c^5$.

The inner ends of the plugs $b$, $c$, are made smaller in diameter than the internal diameter of the fitting so as to present an annular space for the lining to be formed.

The end pieces $b^2$, $c^2$, may be made independent of the screw plugs, instead of integral therewith, if desired, as represented in Fig. 3.

By allowing the screw threaded portions of the plugs $b$, $c$, to extend inward beyond the flanges $a$, $a$, the molten metal may be cast or formed around said screw threaded portions, thereby forming screw threads in the lining, in continuation of the threads on the flanges.

I claim—

A union or coupling having an inwardly extended screw threaded flange $a$ at each end, combined with an externally screw threaded base plug $b$, screwed into one end, and an externally screw threaded pouring plug $c$, having a passage through it, screwed into the other end, the threaded portions of said plugs projecting inwardly beyond the flanges $a$, end portions $b^2$, $c^2$, at the inner ends of the threaded portions of the plugs $b$, $c$, reduced in diameter, and abutting together, and forming in conjunction with the inner projecting threaded portions of the plugs, an annular space within the coupling and between the flanges $a$ thereof, into which the molten metal is poured to form a lining, the ends of which are screw threaded in continuation of the screw threads in the flanges $a$, substantially as described.

In testimony whereof I have signed my name to this specification in the presence of two subscribing witnesses.

GEORGE W. HARRINGTON.

Witnesses:
EDW. C. STORROW,
B. J. NOYES.